US012599951B2

(12) United States Patent
Dallan

(10) Patent No.: US 12,599,951 B2
(45) Date of Patent: Apr. 14, 2026

(54) LINE FOR PRODUCING METAL PROFILES FOR PLASTERBOARD FALSE CEILINGS

(71) Applicant: DALLAN S.p.A., Castelfranco Veneto (IT)

(72) Inventor: Andrea Dallan, Castelfranco Veneto (IT)

(73) Assignee: DALLAN S.p.A., Castelfranco Veneto (IT)

( * ) Notice: Subject to any disclaimer, the term of this patent is extended or adjusted under 35 U.S.C. 154(b) by 350 days.

(21) Appl. No.: 18/392,070

(22) Filed: Dec. 21, 2023

(65) Prior Publication Data

US 2024/0216978 A1 Jul. 4, 2024

(30) Foreign Application Priority Data

Dec. 28, 2022 (IT) ........................ 102022000027015

(51) Int. Cl.
*B21D 28/24* (2006.01)
*B21D 5/08* (2006.01)
(Continued)

(52) U.S. Cl.
CPC .............. *B21D 28/243* (2013.01); *B21D 5/08* (2013.01); *B23P 15/00* (2013.01); *B23P 23/06* (2013.01);
(Continued)

(58) Field of Classification Search
CPC .............................. B21D 35/00; B21D 35/001
See application file for complete search history.

(56) References Cited

U.S. PATENT DOCUMENTS

| | | | | |
|---|---|---|---|---|
| 6,925,707 | B1 * | 8/2005 | Dallan | B23Q 11/0816 |
| | | | | 29/897.3 |
| 2015/0128422 | A1 * | 5/2015 | Rasmussen | E04D 1/265 |
| | | | | 29/897.32 |

(Continued)

FOREIGN PATENT DOCUMENTS

| | | | | |
|---|---|---|---|---|
| AU | 2012297120 B2 * | 9/2016 | | B21D 35/001 |
| CN | 110142334 A * | 8/2019 | | B21D 35/002 |

(Continued)

OTHER PUBLICATIONS

Search Report for 2022000027015 dated Jun. 27, 2023, Munich, DE.

*Primary Examiner* — Jared O Brown
(74) *Attorney, Agent, or Firm* — ArentFox Schiff LLP; Michael Fainberg

(57) ABSTRACT

A line for producing metal profiles for plasterboard false ceilings has in sequence, along a profile advancement direction, a profiling machine, a cutting group, a punching group, a system for extracting finished metal profiles from the punching group, and a management and control unit. The punching group has a first punching press of the portal type having a first punching head elongated along a first operating direction, and a second punching press of the portal type having a second punching head elongated along a second operating direction, parallel to the first operating direction and staggered with respect thereto along the profile advancement direction. The first punching head is longer than the second punching head. The management and control unit is configured to alternately operate in use the first or second punching press as a function of type or length of the metal profiles in output from the cutting group.

14 Claims, 5 Drawing Sheets

(51) Int. Cl.

| | |
|---|---|
| *B23P 15/00* | (2006.01) |
| *B23P 23/06* | (2006.01) |
| *B21D 35/00* | (2006.01) |
| *B21D 43/00* | (2006.01) |
| *B21D 43/28* | (2006.01) |

(52) U.S. Cl.

CPC .............. *B21D 35/00* (2013.01); *B21D 43/00* (2013.01); *B21D 43/285* (2013.01)

(56) References Cited

U.S. PATENT DOCUMENTS

| | | | |
|---|---|---|---|
| 2019/0337045 A1* | 11/2019 | Briese | ................. B30B 15/0029 |
| 2022/0381084 A1 | 12/2022 | Dallan | |

FOREIGN PATENT DOCUMENTS

| | | | | |
|---|---|---|---|---|
| CN | 110142335 A | * | 8/2019 | ............. B21D 43/18 |
| IT | 201800004328 A1 | | 10/2019 | |
| WO | WO-2019197953 A1 | * | 10/2019 | ........... B21D 35/001 |

* cited by examiner

LINE FOR PRODUCING METAL PROFILES FOR PLASTERBOARD FALSE CEILINGS

CROSS REFERENCE TO RELATED APPLICATION

This application claims priority to and benefit of Italian Patent Application No. 102022000027015 filed Dec. 28, 2022, the contents of which are incorporated by reference in their entirety.

FIELD OF THE INVENTION

The object of the present invention is a line for producing metal profiles for plasterboard false ceilings.

The line, according to the invention, allows for the production of metal profiles of various lengths whilst simplifying their production from aa plant engineering point of view.

BACKGROUND OF THE INVENTION

As is known, plasterboard false ceilings comprise a frame whereto plasterboard panels are fastened. In turn, the frame comprises a grid of metal profiles that are connected to therebetween.

One particularly diffuse false ceiling solution envisages the construction of frames using T section metal profiles.

More specifically, the frame comprises:

a plurality of main profiles (called main runners in jargon) which are produced with a standard length (typically 3600 mm); and a plurality of secondary profiles (called cross T in jargon) which are generally produced in two different lengths, typically 1200 mm and 600 mm.

The main profiles are arranged parallel therebetween and form the main carcass of the frame. The longer secondary profiles (1200 mm) connect the main profiles therebetween and are always used in the construction of a frame; the shorter secondary profiles (600 mm) connect the longer length secondary profiles therebetween and are used in the construction of a frame only for grid meshes of reduced dimensions.

Generally, both the main profiles and the secondary profiles are provided at the ends thereof with coupling terminals intended to engage with appropriate holes located within the profiles themselves along the longitudinal extension thereof, so as to allow for the rapid assembly of the frame.

The main profiles and the secondary profiles may be differentiated therebetween not only by the length and the number of holes but eventually also by the height of the profile (greater for the main profiles) and by the coupling terminals.

For this reason, operationally, separate production lines are provided: a production line dedicated to the production of main profiles; and a production line dedicated to the production of secondary profiles.

Typically, a production line for metal profiles with a T cross-section (both for main profiles and for secondary profiles) comprises the following operating stations: one or two metal strip winding reels;

a profiling machine suitable for profiling the metal strip in order to obtain a continuous metal profile;

a cutting group arranged downstream of the profiling machine suitable for cutting said continuous metal profile into pieces of predefined lengths which constitute the metal profiles;

optionally, downstream of the cutting group, a group for the application of coupling terminals to both ends of each of the aforesaid metal profiles, supplied with a metal strip by means of one or more winding reels;

a punching group that comprises a press and that is suitable for producing appropriate holes along the longitudinal extension of each single metal profile, generally arranged downstream of the group for the application of terminals; and a system for extracting the finished metal profiles from the punching group.

In the production of the main and secondary metal profiles one of the most important differentiating operating points lies with the punching group. In fact, due to the different lengths and different numbers of holes to be made, presses with different mechanical and operating features are necessary. Typically, the punching of the main metal profiles is performed using a press with a production speed of 27 pieces/minute, whilst the punching of the secondary metal profiles is performed using a smaller but faster press that is able to ensure a higher production speed (typically 40 pieces/minute).

Operationally the larger press may also be used for the punching of secondary metal profiles. However, the production speed would be excessively low taking into account the fact that the secondary metal profiles generally represent about 75% of production.

To concentrate, therefore, on a single line the production of main metal profiles and of secondary metal profiles would excessively penalize the production speed of the secondary metal profiles. For this reason, production management using two separate lines continues, accepting the higher installation costs related to this operating choice.

Today, with a view to reducing plant costs, there still continues to be a great need for a production line that is capable of producing both types of metal profiles without limiting the production speed of the secondary metal profiles.

To date, however, this need remains unsatisfied.

SUMMARY OF THE INVENTION

Consequently, the main object of the present invention is that of eliminating, either completely or in part, the disadvantages of the aforementioned state of the art and making available a line for producing metal profiles for plasterboard false ceilings that is capable of producing both types of metal profiles without limiting the production speed of the secondary metal profiles.

A further object of the present invention is that of providing a line for producing metal profiles for plasterboard false ceilings that it is operationally simple to control.

A further object of the present invention is that of providing a line for producing metal profiles for plasterboard false ceilings with manufacturing costs that are comparable to traditional apparatuses.

BRIEF DESCRIPTION OF THE DRAWINGS

The technical features of the present invention, according to the aforesaid objects, may be clearly seen in the contents of the claims below, and its advantages will become more readily apparent in the detailed description that follows, made with reference to the accompanying drawings, which represent one or more purely exemplifying and non-limiting embodiments thereof, wherein:

DETAILED DESCRIPTION

The line for producing metal profiles for plasterboard false ceilings according to the present invention is indicated in the entirety thereof with the numeral 1 in the attached Figures.

Here and in the rest of the description and in the claims, reference will be made to the line 1 under usage conditions. Therefore, any references to a lower or upper position or to a horizontal or vertical orientation should be interpreted in this sense.

Figures 1, 2:
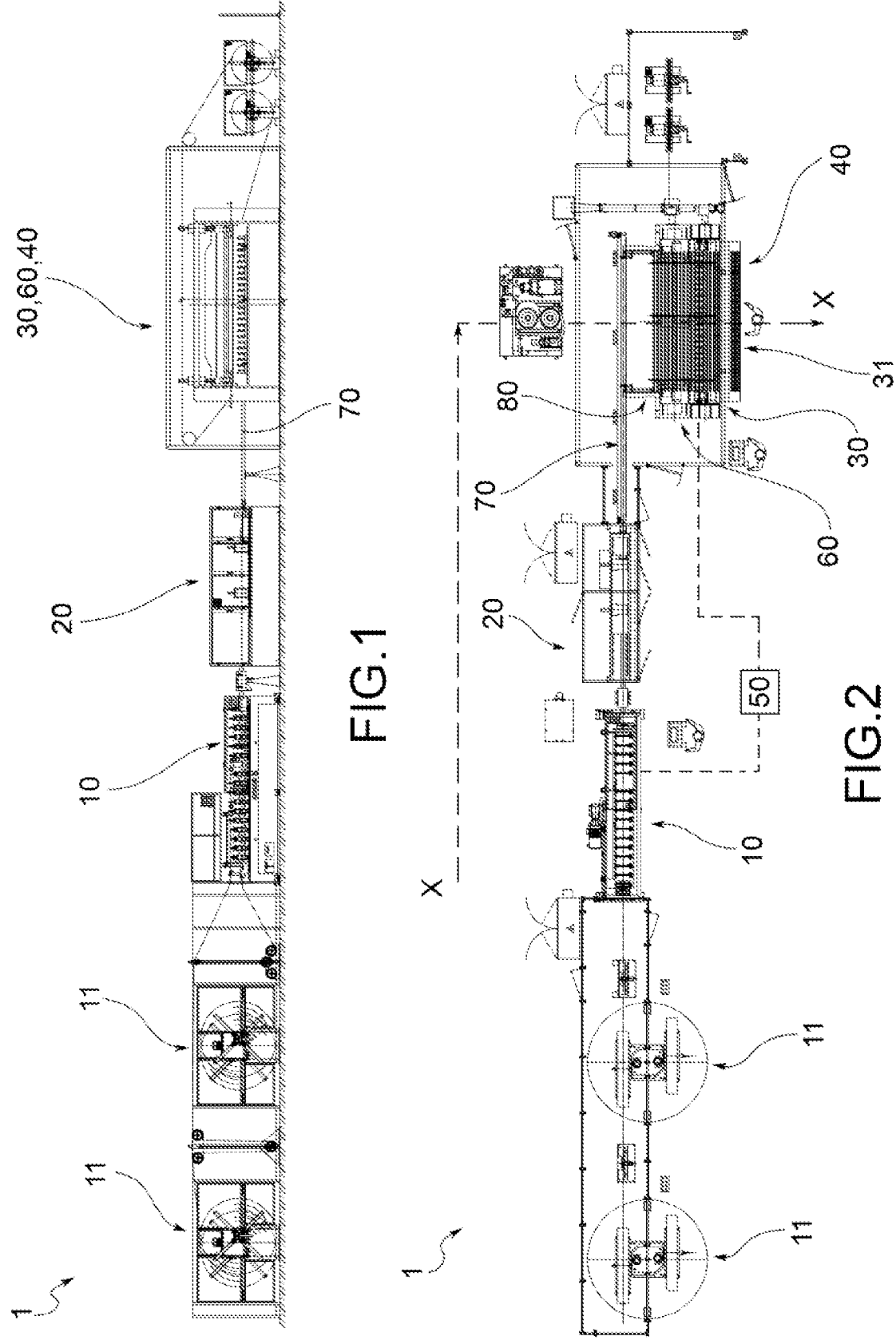
FIG. 1 shows an orthogonal elevation view of a line for producing metal profiles for plasterboard false ceilings according to one preferred embodiment of the present invention.
FIG. 2 shows an orthogonal view from above of the line of FIG. 1.
Figures 3, 4:
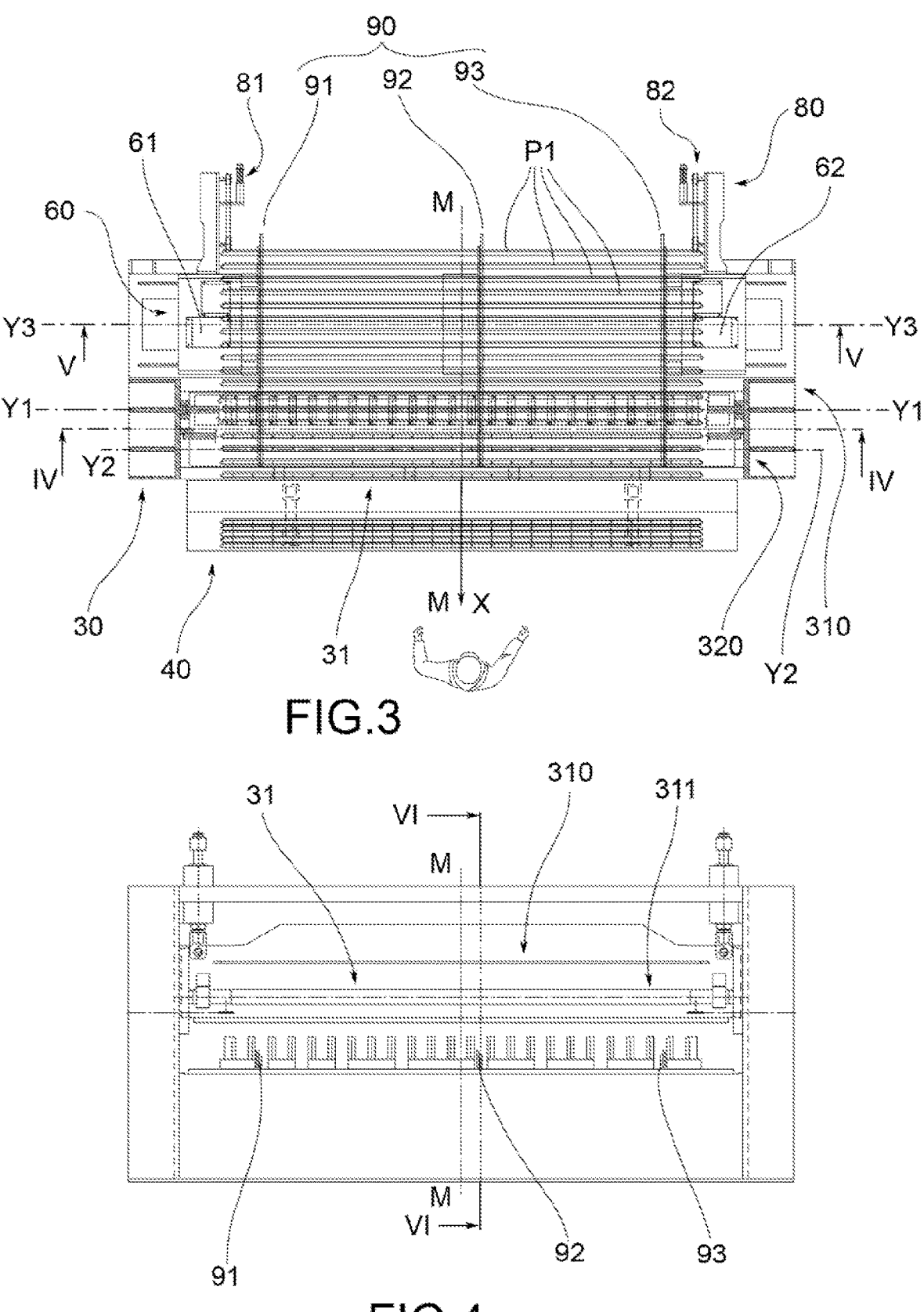
FIG. 3 shows an enlarged view of part of the line of FIG. 1 in relation to a group for the application of coupling terminals and a punching group comprising two different punching presses, wherein said production line is shown (with some parts removed to better illustrate others) in an operating configuration that is suitable for the production of main metal profiles.
FIG. 4 shows an orthogonal elevation view of a first punching press forming part of the punching group shown in FIG. 3, said view being made according to the cross-section line IV-IV shown therein.
Figures 5, 6:
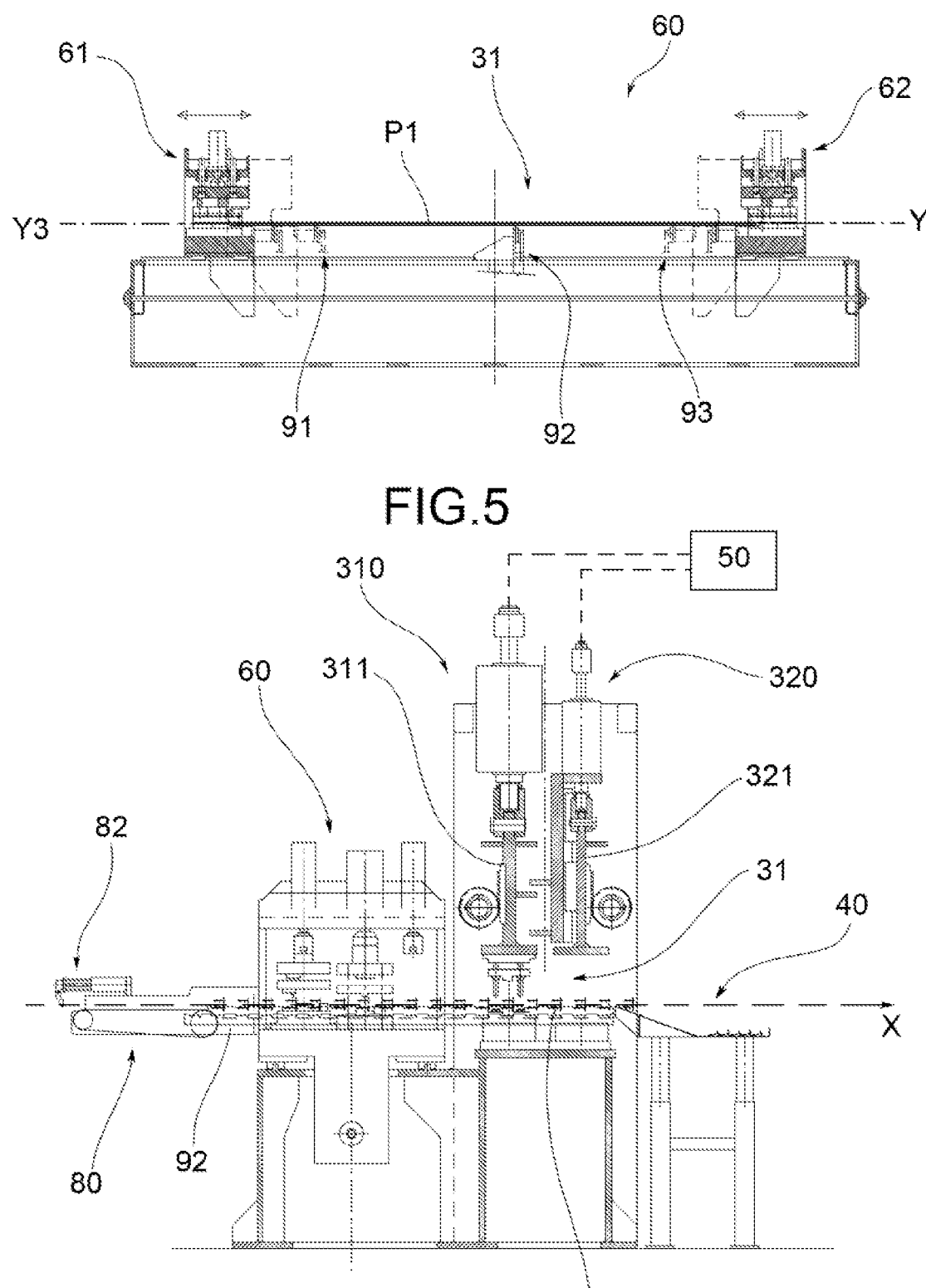
FIG. 5 shows an orthogonal elevation view of the group for the application of coupling terminals depicted in FIG. 3, said view being made according to the cross-section line V-V shown therein.
FIG. 6 shows an orthogonal elevation view of the group for the application of coupling terminals and of the punching group depicted in FIG. 3 according to the cross-section line VI-VI depicted in FIG. 4.
Figure 7:
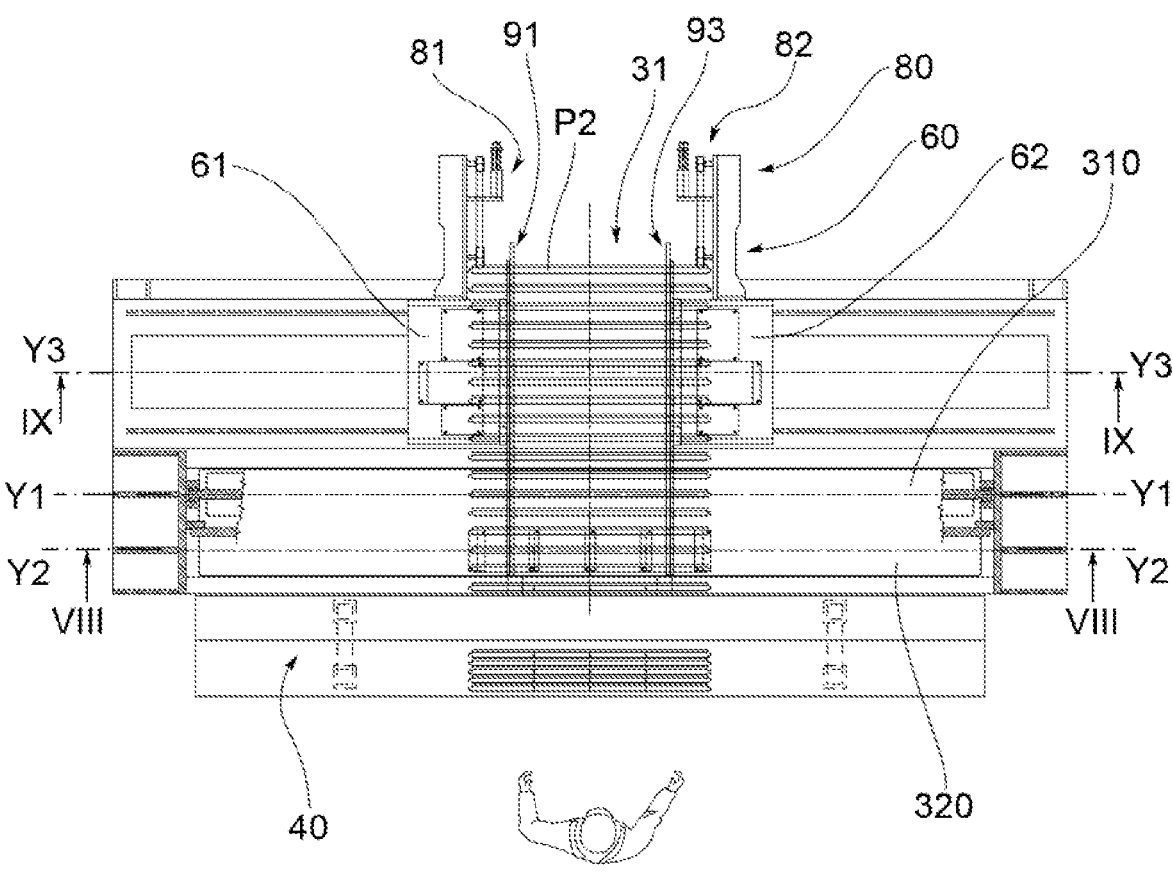
FIG. 7 shows an enlarged view of part of the line of FIG. 1 in relation to a group for the application of coupling terminals and a punching group comprising two different punching presses, wherein said production line is shown (with some parts removed to better illustrate others) in an operating configuration that is suitable for the production of secondary metal profiles.
Figure 8:
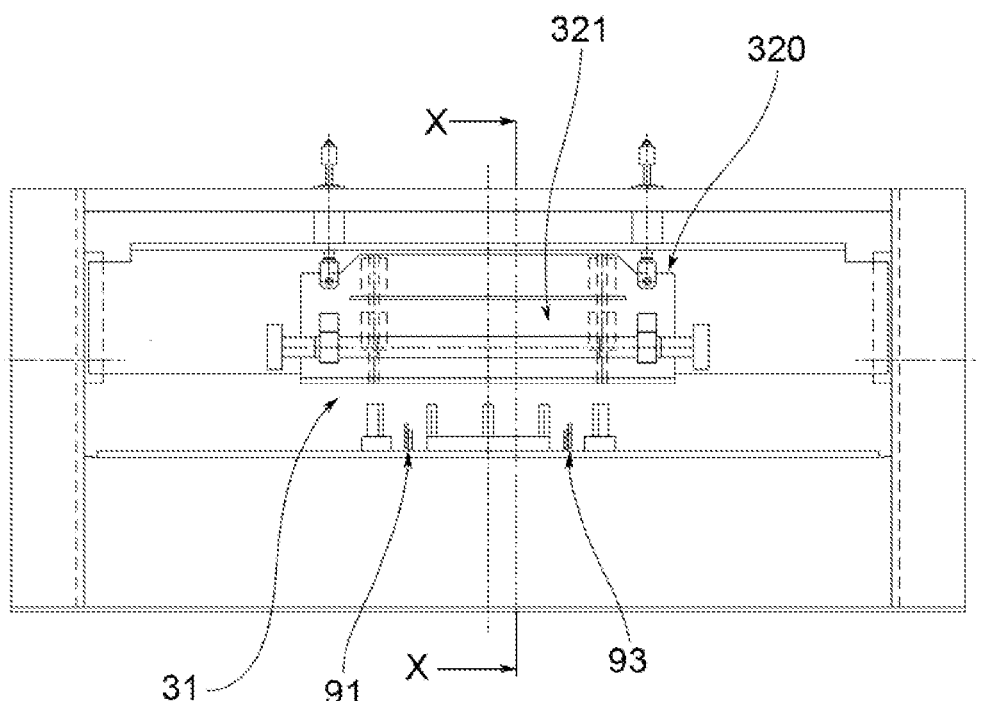
FIG. 8 shows an orthogonal elevation view of a second punching press forming part of the group depicted in FIG. 7, said view being made according to the cross-section line VIII-VIII shown therein.
Figures 9, 10:
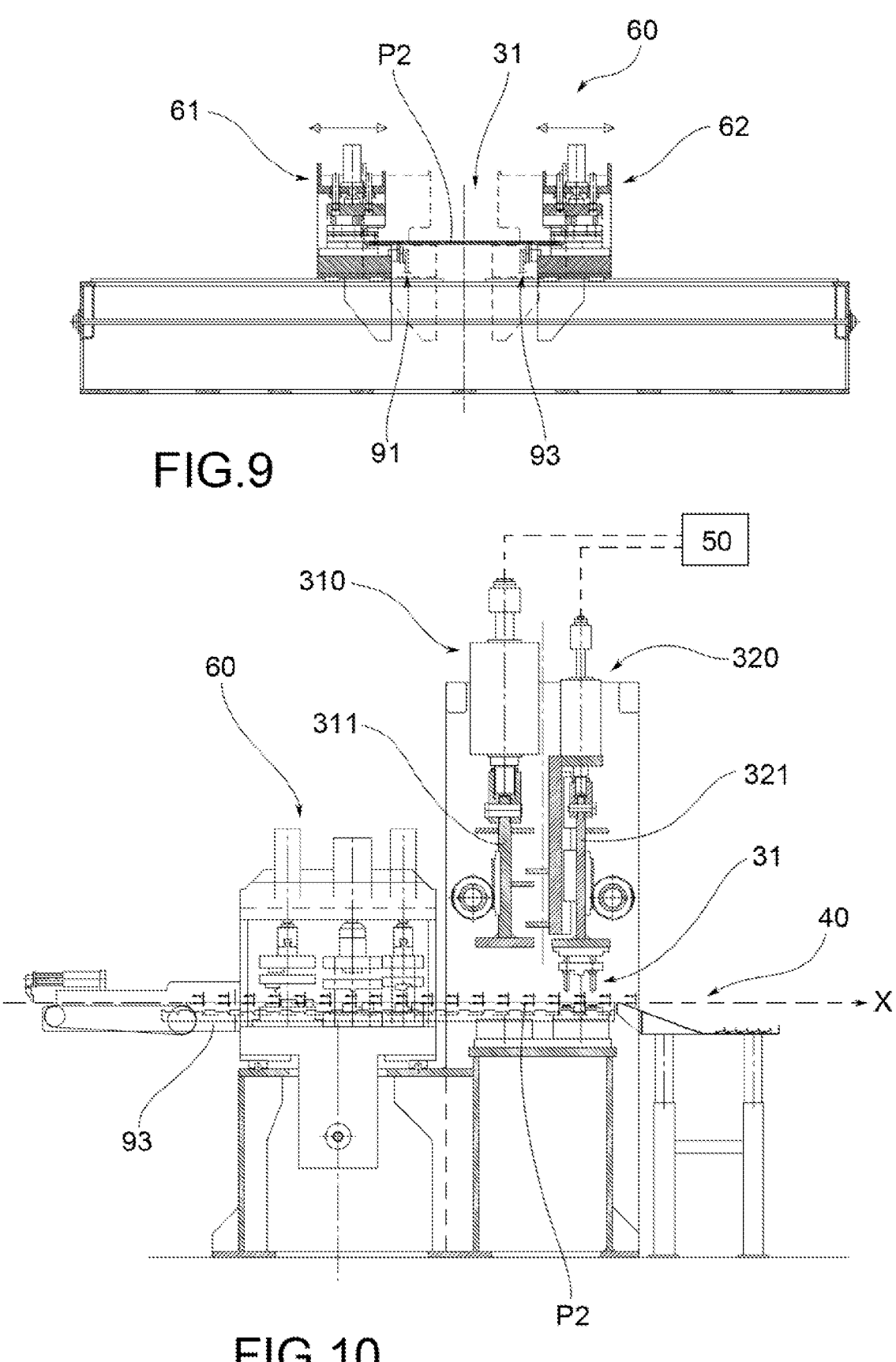
FIG. 9 shows an orthogonal elevation view of the group for the application of coupling terminals depicted in FIG. 7, said view being made according to the cross-section line IX-IX shown therein.
FIG. 10 shows an orthogonal elevation view of the group for the application of coupling terminals and of the punching group depicted in FIG. 7 according to the cross-section line X-X shown in FIG. 8.

According to one general embodiment of the present invention, as shown in FIG. 1, the line 1 comprises, in sequence, along a profile advancement direction X:

a profiling machine 10;

a cutting group 20;

a punching group 30; and an extraction system 40 for extracting the finished metal profiles P1, P2 from the punching group 30.

As shown in FIG. 2, the advancement direction X of the profiles may follow a broken straight line path. In particular, within some sections said advancement direction X is parallel to the longitudinal extension direction of the profiles (see the section along the profiling machine 10 of the cutting group 20), whilst in other sections said advancement direction X is orthogonal to the longitudinal extension direction of the profiles (see the section along the punching group 30 and the extraction system 40 of the profiles).

The profiling machine 10 is suitable for profiling a metal strip to obtain a continuous metal profile having a predefined transverse cross-section. Preferably, the transverse section is T shaped.

In particular, the profiling machine 10 is supplied upstream by at least one metal strip reel supported by a winder 11. The profiling machine 10 may be of any type and will not be described in further detail insofar as it is known by a person skilled in the art.

The cutting group 20, arranged downstream of the profiling machine 10, is suitable for cutting the continuous metal profile into pieces of predefined lengths which constitute the metal profiles P for plasterboard false ceilings. In particular, the cutting group 20 may be controlled by means of the management and control unit 50 in order to automatically adjust the length of the cut pieces (profiles).

In particular, the cutting group 20 may be controlled so as to cut pieces of a predefined length corresponding to:

main metal profiles P1, having for example a typical length of 3600 mm;

secondary metal profiles P2 of a greater length, having for example a typical length of 1200 mm; and secondary metal profiles P3 of a shorter length, having for example a typical length of 600 mm.

The cutting group 20 may be of any type and will not be described in further detail insofar as it is known by a person skilled in the art.

The punching group 30 is arranged downstream of the cutting group 20 and is suitable for making holes on each metal profile P1, P2, P3 along the longitudinal extension of the latter. In particular, the punching group 30 is installed within a profile movement lane 31, which will be better described hereinafter.

The extraction system 40 is suitable for extracting the profiles from the punching group 30. In particular, the extraction system 40 is located at the end of the aforementioned profile movement lane 31.

The line 1 comprises, furthermore, a management and control unit 50 that is preferably provided with a control interface. The management and control unit 50 is suitable for controlling at least one cutting group 20 and said punching group 30.

Preferably, as shown in FIG. 2, the line 1 comprises, furthermore:

a conveyor 70 for transferring the metal profiles P1, P2, P3 from said cutting group 20 to said punching group 30, said conveyor 70 being configured to move the metal profiles P1, P2, P3 parallel to the longitudinal extension direction thereof; and a profile transfer device 80 for transferring the profiles P1, P2 that is suitable for pushing the metal profiles from said conveyor 70 and inserting them into the punching group 30, arranging them with the longitudinal extension axis orthogonal to the advancement direction X; and a profile movement device 90 which is suitable for making the profiles advance starting from the profile transfer device 80 to the extraction system 40 inside a profile movement lane 31—through the punching group 30—with a direction orthogonal to the longitudinal extension axis of the metal profiles.

The term profile movement lane 31 refers to the space equipped for profile handling that extends from the profile transfer device 80 to the extraction system 40.

In particular, the profile movement device 90 is suitable for making the profiles advance through the punching group with a direction orthogonal to a first and second operating direction Y1, Y2, which will be defined further on.

In particular, the profile movement device 90 is suitable for moving the metal profiles P1, P2, P3 along said profile movement lane 31.

The conveyor 70 may be of any type and will not be described in further detail insofar as it is known by a person skilled in the art. Preferably, the conveyor 70 is defined by a conveyor belt or by a motorized roller.

Advantageously, the conveyor 70 is provided with a mechanical stop 71 wherein the position thereof is adjustable along the advancement direction X. Operationally, the mechanical stop 71 is adjusted in position so as to arrange the metal profiles P1, P2, P3 centered lengthwise along the centerline M-M of the profile movement lane 31.

The profile transfer device 80 may be of any type and will not be described in further detail insofar as it is known by a person skilled in the art.

In particular, the profile transfer device 80 may comprise two pushers 81, 82 that are configured to laterally push one profile at a time from the conveyor belt 70 towards the punching group 30 within the aforementioned profile movement lane 31 as the profiles reach the profile transfer device 80. The two pushers 81, 82 are moveable in parallel to the conveyor belt 70 in order to adapt themselves to the length of the profiles and to center themselves in turn in relation to the centerline M-M of the profile movement lane 31.

Preferably, the profile movement device 90 may be of any type and will not be described in further detail insofar as it is known by a person skilled in the art. In particular, the profile movement device 90 is defined by a plurality of combs 91, 92, 93 parallel to each other and to the profile advancement direction X. Each comb extends substantially in length from the profile transfer device 80 up to the extraction system 40 and is cyclically movable so as to impart to each individual profile a stepwise advancing movement.

Advantageously, the combs are distributed over the width (a dimension transverse to the advancement direction X) of the profile movement lane 31 and are movable orthogonally to the profile advancement direction X so that it is possible to adjust the distribution thereof within the metal lane 31 as a function of the type of metal profiles treated.

Advantageously, as shown in FIG. 2, the line 1 comprises, furthermore—downstream of the cutting group 20—a group for the application of coupling terminals 60 which is suitable for applying coupling terminals to both ends of each of the metal profiles.

Preferably, the group for the application of coupling terminals 60 is arranged upstream of the punching group 30 and downstream of the profile transfer device 80 and is integrated into said profile movement device 90. Operationally, similarly to what occurs in the punching group 30, the metal profiles P1, P2 are caused to advance within the group for the application of coupling terminals 60 by means of said profile movement device 90.

In other words, the group for the application of coupling terminals 60 is arranged within the profile movement lane 31.

Advantageously, as shown in particular in FIGS. 3, 5, 7 and 9, the group for the application of coupling terminals 60 comprises two coupling terminal application heads 61, 62 which are aligned along a coupling terminal application direction Y3, parallel to the longitudinal extension direction of the profiles and orthogonal to the advancement direction X of the profiles themselves.

In particular, the coupling terminal application direction Y3 is parallel to a first operating direction Y1 and a second operating direction Y2, which will be defined further on.

Operationally, said two application heads 61, 62 are movable along said coupling terminal application direction in order to adapt themselves to the length of the metal profiles P1, P2, P3 to be processed.

In more detail, said coupling terminal application heads 61, 62 are mounted on motorized carriages sliding on guides that are parallel to said coupling terminal application direction Y3. Said management and control unit 50 is configured so as to operate in use said motorized carriages so as to adjust the position of said two application heads 61, 62 along said coupling terminal application direction Y3 as a function of the type or length of the metal profiles P1, P2, P3 in output from the cutting group 20.

Operationally, the two application heads 61, 62 are moved in holding themselves equidistant from the centerline M-M of the profile movement lane 31.

According to the present invention, the punching group 30 comprises:

a first portal-type punching press 310 having a punching head 311 elongated along a first operating direction Y1; and a second portal-type punching press 320 having a second punching head 321 extended along a second operating direction Y2, which is parallel to said first operating direction Y1 and is offset therefrom along said advancement direction X of the profiles, The first punching head 311 of said first punching press 310 is longer than the second punching head 321 of the second punching press 320.

Operationally, the management and control unit 50 is configured so as to alternatively operate in use said first punching press 310 or said second punching press 320 as a function of the type or length of the metal profiles P1, P2 in output from the cutting group 20.

By virtue of the present invention it is therefore possible to size two presses 310 and 320 in a differentiated manner as a function of the type of metal profile that is to be treated. In other words, due to the fact that each press may be dedicated to a particular type of metal profile, it is possible to optimize its operation with a view to the operational efficiency of the production line 1. In particular, it is possible to size, in an optimal manner, each press as a function of the production speed of the metal profile to be processed. In more detail, the second punching press 320 (of reduced dimensions in relation to the first punching press 310) may be sized so as to ensure a processing rate that is appropriate to the production speed of the secondary profiles P2. The first punching press 310 (of greater dimensions and therefore suitable for working at lower processing rates) may be dedicated to processing the main profiles P1, wherein the production speed is lower than the production speed of the secondary profiles P2.

As such, the line 1 for the production of metal profiles for plasterboard false ceilings is capable of producing both types of metal profiles without, however, limiting the production speed of the secondary metal profiles.

The installation configuration adopted renders, furthermore, the production line 1, according to the invention operationally simple to control.

The line 1 for producing metal profiles for plasterboard false ceilings has, finally, implementation costs comparable to those of a traditional production line, since it essentially only provides for the addition of one additional press.

Advantageously, both the punching presses 310 and 320 are fixed in position and centered in relation to the centerline M-M of the profile movement lane 31.

As previously highlighted, the main profiles produced by line 1 are differentiated from one another—depending upon the length thereof—into main metal profiles P1 and secondary metal profiles P2.

Preferably, the first punching head 311 of said first punching press 310 is sized in length so as to work over the main metal profiles P1.

Preferably, the second punching head 321 of said second punching press 320 is sized in length so as to work over the secondary metal profiles P2.

Advantageously, the first punching press 310 may be equipped with punching dies different in type and/or number with respect to the punching dies with which said second punching press 320 is equipped.

Preferably, the first punching press 310 is equipped with punching dies 312 for the main metal profiles P1, while the second punching press 320 is equipped with punching dies 322 for the secondary metal profiles P2.

In particular, the first punching press 310 is sized to process at most from 25 to 30 pieces/minute, whilst the second punching press 320 is sized to process a maximum of 40 to 45 pieces/minute.

Advantageously, the extraction system 40 of the finished metal profiles P1, P2 from the punching group 30 comprises a collection plane 31 which extends parallel to the punching heads of the two punching presses 310, 320.

More specifically, the extraction system 40 is configured to receive the metal profiles P1, P2 from the profile movement device 90 according to a movement direction transverse to the longitudinal extension direction of the punching heads 311, 321 of the two punching presses 310, 320.

Operationally, the metal profiles P1, P2 are extracted from the punching group frontally, maintaining the same orientation as they had in the punching group. The extraction system 40 may thus be effectively reduced to a device for collecting/receiving profiles pushed by the movement device 90 out of the punching group 30. Operationally, the movement imparted to the profiles in the punching group may also be directly exploited for the profile extraction operation in the punching group itself. In fact, both the presses 310 and 320 (being of the portal type) may be traversed by the metal profiles and allow the profiles to pass along the advancement direction X. Thus, there is no need to impose deviations to the profiles relative to the advancement direction within the punching group and thus to equip the extraction system with specific profile movement devices. This simplifies the structure of the extraction system 40.

The present invention allows numerous advantages to be obtained, which have already been described in part.

The line 1 for the production of metal profiles for plasterboard false ceilings is capable of producing both types of metal profiles without, however, limiting the production speed of the secondary metal profiles.

The installation configuration adopted renders, furthermore, the production line 1, according to the invention operationally simple to control.

The line 1 for producing metal profiles for plasterboard false ceilings has, finally, implementation costs comparable to those of a traditional production line, since it essentially only provides for the addition of one additional press.

The invention thus conceived therefore achieves its intended objectives.

Obviously, in practice it may also assume different forms and configurations from the one illustrated above, without thereby departing from the present scope of protection.

Furthermore, all details may be replaced with technically equivalent elements, and the dimensions, shapes, and materials used may be any according to the needs.

What is claimed is:

1. A line for producing metal profiles for plasterboard false ceilings, the line comprising in sequence along a profile advancement direction:

a profiling machine suitable to profile a metal strip to obtain a continuous metal profile;

a cutting group placed downstream of the profiling machine and suitable to cut said continuous metal profile into pieces of predefined lengths which constitute said metal profiles for plasterboard false ceilings;

a punching group placed downstream of the cutting group and suitable to make holes on each metal profile along a longitudinal extension thereof; and an extraction system for extracting finished metal profiles from the punching group, said line further comprising a management and control unit configured to control at least said cutting group and said punching group, wherein said punching group comprises:

a first portal press having a first punching head elongated along a first operating direction; and a second portal press having a second punching head elongated along a second operating direction, parallel to said first operating direction and staggered with respect thereto along said profile advancement direction, and wherein said management and control unit is configured to alternately operate in use said first portal press or said second portal press as a function of type or the predefined lengths of the metal profiles output from the cutting group;

wherein said metal profiles comprise main metal profiles and secondary metal profiles which are different in length from the main metal profiles; and wherein said first portal press is equipped with punching dies that are different in type and/or number with respect to punching dies with which said second portal press is equipped, such that said first portal press works on only the main metal profiles whereas said second portal press works on only the secondary metal profiles.

2. The line of claim 1, further comprising:

a conveyor for transferring the metal profiles from said cutting group to said punching group, wherein said conveyor is configured to move the metal profiles parallel to a longitudinal extension of the metal profiles;

a profile transfer device suitable to push the metal profiles from said conveyor and insert the metal profiles in the punching group so that a longitudinal extension axis of the metal profiles is parallel to said first and second operating directions; and a profile movement device suitable to make the metal profiles advance starting from the profile transfer device to the extraction system within a profile movement lane through the punching group with a direction orthogonal to the longitudinal extension axis of the metal profiles, keeping the metal profiles parallel to said first and second operating directions.

3. The line of claim 1, wherein the first punching head of said first portal press is sized in length to work on the main metal profiles.

4. The line of claim 1, wherein the second punching head of said second portal press is sized in length to work on the secondary metal profiles.

5. The line of claim 1, wherein said first portal press is configured to process at most from 25 to 30 pieces/min.

6. The line of claim 1, wherein said second portal press is configured to process at most from 40 to 45 pieces/min.

7. The line of claim 1, wherein said extraction system comprises a collection plane that extends parallel to the first and second punching heads.

8. The line of claim 7, wherein said extraction system is configured to receive the metal profiles according to a movement direction transverse to the first operating direction of the first punching head.

9. The line of claim 1, further comprising downstream of the cutting group, and upstream of the punching group, a group for applying coupling terminals that is suitable to apply coupling terminals to both ends of each of the metal profiles.

10. The line of claim 9, wherein the line further comprises:

a conveyor for transferring the metal profiles from said cutting group to said punching group, wherein said conveyor is configured to move the metal profiles parallel to a longitudinal extension of the metal profiles;

a profile transfer device suitable to push the metal profiles from said conveyor and insert the metal profiles in the punching group so that a longitudinal extension axis of the metal profiles is parallel to said first and second operating directions; and a profile movement device suitable to make the metal profiles advance starting from the profile transfer device to the extraction system within a profile movement lane through the punching group with a direction orthogonal to the longitudinal extension axis of the metal profiles, keeping the metal profiles parallel to said first and second operating directions, and wherein said group for applying coupling terminals is placed downstream of the profile transfer device and is integrated with said profile movement device.

11. The line of claim 9, wherein said group for applying coupling terminals comprises two coupling terminal application heads aligned along a coupling terminal application direction parallel to the first operating direction and to the second operating direction, and wherein said two coupling terminal application heads are movable along said coupling terminal application direction to adapt to the predefined lengths of the metal profiles to be processed.

12. The line of claim 11, wherein said two coupling terminal application heads are mounted on motorized carriages sliding on guides parallel to said coupling terminal application direction, and wherein said management and control unit is configured to operate in use said motorized carriages so as to adjust a position of said two coupling terminal application heads along said coupling terminal application direction as a function of the type or the predefined lengths of the metal profiles in output from the cutting group.

13. A line for producing metal profiles for plasterboard false ceilings, the line comprising in sequence along a profile advancement direction:

a profiling machine suitable to profile a metal strip to obtain a continuous metal profile;

a cutting group placed downstream of the profiling machine and suitable to cut said continuous metal profile into pieces of predefined lengths which constitute said metal profiles for plasterboard false ceilings;

a punching group placed downstream of the cutting group and suitable to make holes on each metal profile along a longitudinal extension thereof; and an extraction system for extracting finished metal profiles from the punching group, said line further comprising a management and control unit configured to control at least said cutting group and said punching group, wherein said punching group comprises:

a first portal press having a first punching head elongated along a first operating direction; and a second portal press having a second punching head elongated along a second operating direction, parallel to said first operating direction and staggered with respect thereto along said profile advancement direction, and wherein the first punching head of said first portal press is longer than the second punching head of the second portal press, said management and control unit is configured to alternately operate in use said first portal press or said second portal press as a function of type or the predefined lengths of the metal profiles output from the cutting group;

wherein said first portal press is configured to process at most from 25 to 30 pieces/min said second portal press is configured to process at most from 40 to 45 pieces/min.

14. A line for producing metal profiles for plasterboard false ceilings, the line comprising in sequence along a profile advancement direction:

a profiling machine suitable to profile a metal strip to obtain a continuous metal profile;

a cutting group placed downstream of the profiling machine and suitable to cut said continuous metal profile into pieces of predefined lengths which constitute said metal profiles for plasterboard false ceilings;

a punching group placed downstream of the cutting group and suitable to make holes on each metal profile along a longitudinal extension thereof; and an extraction system for extracting finished metal profiles from the punching group, said line further comprising a management and control unit configured to control at least said cutting group and said punching group, wherein said punching group comprises:

a first portal press having a first punching head elongated along a first operating direction; and a second portal press having a second punching head elongated along a second operating direction, parallel to said first operating direction and staggered with respect thereto along said profile advancement direction, and wherein the first punching head of said first portal press is longer than the second punching head of the second portal press, said management and control unit is configured to alternately operate in use said first portal press or said second portal press as a function of type or the predefined lengths of the metal profiles output from the cutting group;

a group for applying coupling terminals that is suitable to apply coupling terminals to both ends of each of the metal profiles;

wherein said group for applying coupling terminals comprises two coupling terminal application heads aligned along a coupling terminal application direction parallel to the first operating direction and to the second operating direction, and wherein said two coupling terminal application heads are movable along said coupling terminal application direction to adapt to the predefined lengths of the metal profiles to be processed;

wherein said two coupling terminal application heads are mounted on motorized carriages sliding on guides parallel to said coupling terminal application direction, and wherein said management and control unit is configured to operate in use said motorized carriages so as to adjust a position of said two coupling terminal application heads along said coupling terminal application direction as a function of the type or the predefined lengths of the metal profiles in output from the cutting group.

\* \* \* \* \*